United States Patent
Stenzel et al.

(10) Patent No.: US 9,555,901 B2
(45) Date of Patent: Jan. 31, 2017

(54) METHOD FOR PROTECTING THE SURFACE OF AN AIRCRAFT AGAINST CONTAMINATION WITH INSECT RESIDUES AND/OR ICING

(75) Inventors: Volkmar Stenzel, Thedinghausen (DE); Yvonne Wilke, Bremen (DE); Steffen Schrübbers, Bremen (DE); Andreas Hartwig, Ritterhude (DE); Georg Niedzwiedzki, Stuhr (DE); Silke Grünke, Bremen (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 757 days.

(21) Appl. No.: 13/320,842

(22) PCT Filed: May 18, 2010

(86) PCT No.: PCT/EP2010/056829
§ 371 (c)(1),
(2), (4) Date: Mar. 19, 2012

(87) PCT Pub. No.: WO2010/133602
PCT Pub. Date: Nov. 25, 2010

(65) Prior Publication Data
US 2012/0160963 A1 Jun. 28, 2012

(30) Foreign Application Priority Data
May 18, 2009 (DE) .................. 10 2009 003 201

(51) Int. Cl.
*B64F 5/00* (2006.01)
*C09D 5/00* (2006.01)
(Continued)

(52) U.S. Cl.
CPC ............ *B64F 5/0018* (2013.01); *C09D 5/008* (2013.01); *C09D 5/1656* (2013.01); *C09D 189/005* (2013.01)

(58) Field of Classification Search
USPC .. 244/134 C, 134 R; 427/154, 553; 118/620, 118/305
See application file for complete search history.

(56) References Cited

U.S. PATENT DOCUMENTS

2010/0162565 A1* 7/2010 Mukherji et al. ............ 29/889.1
2012/0163981 A1* 6/2012 Hong ............................ 416/224

FOREIGN PATENT DOCUMENTS

FR 1 003 239 3/1952
GB 808350 2/1959
(Continued)

OTHER PUBLICATIONS

Lauchmann, G.V., "Aspects of Insect Contamination in Relation to Laminar Flow Aircraft," Ministry of Aviation, Aeronautical Research Council, A.R.C. Technical Report, C.P. No. 484, 1960, p. 28PP, XP002629642, London.
(Continued)

*Primary Examiner* — Valentina Xavier
(74) *Attorney, Agent, or Firm* — Preti Flaherty Beliveau & Pachios LLP

(57) ABSTRACT

A method of protecting a part of a surface of an aircraft against contamination with insect residues and/or against icing is described. The method includes the following steps:
a) coating the part of the surface to be protected with a coating that can, within a period of ≤3 hours from take-off of the aircraft and in normal flying conditions, reduce the adhesion to the part of the surface to be protected until detachment occurs on the basis of (i) temperature change and/or (ii) UV radiation and/or (iii) addition of a decomposing component and/or (iv) difference in air humidity, and
b) exposing the part of the surface to be protected to (i) a temperature change and/or (ii) UV irradiation (iii) and/or addition of a decomposing component and/or
(Continued)

(iv) a difference in air humidity, so that the coating together with any contaminants and/or icing thereon detaches.

9 Claims, 1 Drawing Sheet

(51) Int. Cl.
  *C09D 5/16* (2006.01)
  *C09D 189/00* (2006.01)

(56) References Cited

FOREIGN PATENT DOCUMENTS

| | | |
|---|---|---|
| GB | 2 264 917 | 9/1993 |
| RU | 2161636 C2 | 1/2001 |
| SU | 1779643 | 12/1992 |

OTHER PUBLICATIONS

Young, T.M. et al., "Liquid anti-contamination systems for hybrid laminar flow control aircraft--a review of the critical issues and important experimental results," Proceedings of the Institution of Mechanical Engineers, Part G: Journal of Aerospace Engineering, vol. 218, No. 4, 2004, pp. 267-277.

Chambers, Joseph R., "Innovation in Flight: Research of the NASA Langley Research Center on Revolutionary Advanced concepts for Aeronautics," NASA, SP-2005-4539, 2005, p. I-VII, 1-189.

\* cited by examiner

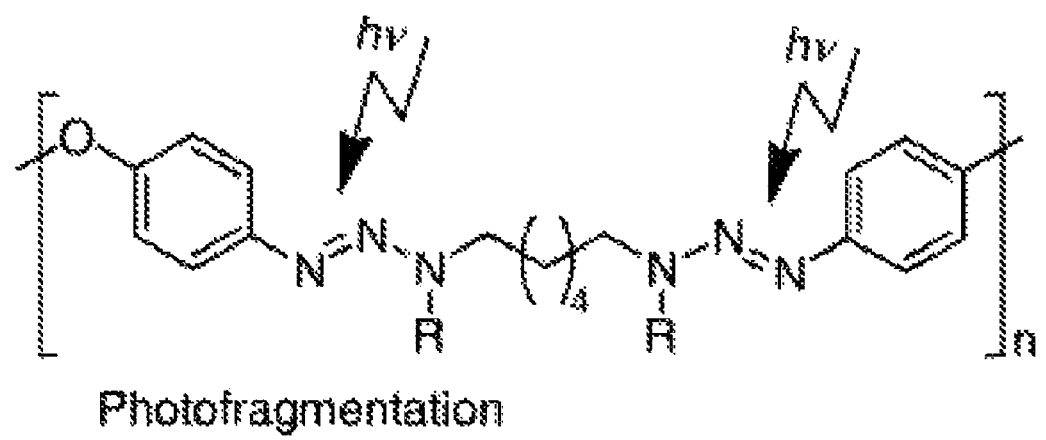
Photofragmentation
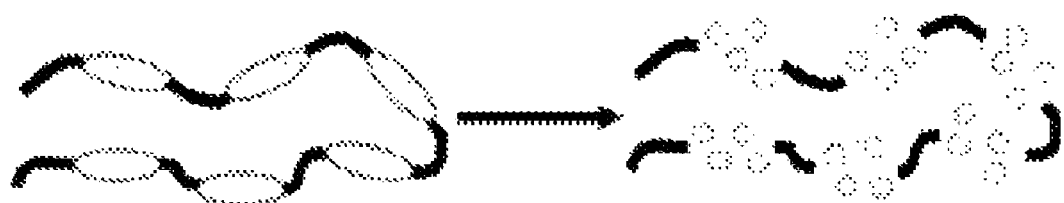

METHOD FOR PROTECTING THE SURFACE OF AN AIRCRAFT AGAINST CONTAMINATION WITH INSECT RESIDUES AND/OR ICING

TECHNICAL FIELD

The invention relates to a method of protecting a part of a surface of an aircraft against contamination with insect residues and/or against icing by providing a layer that detaches from the surface of the aircraft and thereby removes any contaminants and/or icing present thereon. The invention further relates to a correspondingly coated aircraft, a device for applying a corresponding layer on an aircraft and the use of a correspondingly arranged coating for protecting parts of a surface of an aircraft against contamination with insect residues and/or icing and the use of a coating device for coating a part of the surface of an aircraft with a correspondingly arranged coating.

BACKGROUND

It is desirable, for economic and ecological reasons, for aircraft to have the lowest possible fuel consumption. Aircraft of the current generation are as a rule operated with kerosene, and it is assumed at present that kerosene-based fuels will also be the predominant fuel source in future. The costs for corresponding fuels are expected to rise further in future.

There are several approaches for lowering the fuel consumption of aircraft: For example, the use of new materials leads to weight reduction and therefore also to a decrease in fuel consumption. An important approach for lowering fuel consumption is to reduce the air resistance of aircraft. The total drag is greatly influenced by the flow behavior on the wing surfaces. Laminar and turbulent flows can occur on the wing. Laminar flows ensure much less drag compared with turbulent flows. There are two approaches for achieving laminar flow: on the one hand, it is possible to use wings that permit natural laminar flow. On the other hand, a laminar flow profile can also be achieved by means of so-called hybrid laminar flow control (HLFC):

In HLFC, a laminar flow profile is achieved by suction of the air flow through a porous surface. The suction stabilizes the boundary layer and makes laminar flow on the surface possible. This approach involves relatively high energy expenditure.

As already mentioned, it is sensible both ecologically and economically to reduce fuel consumption. In the case of aircraft, from the ecological standpoint decreased fuel consumption not only offers the advantage that there is less emission of greenhouse gases and saving of resources, but also that a decrease in fuel consumption has an especially beneficial effect, as aircraft produce their exhaust gas emissions at altitudes that are particularly sensitive to pollution.

Attainment of laminar flow profiles is already technically achievable. In practice, however, the laminar flow profile is often disturbed by contaminants. The contaminants are deposited on the surface and thus result in a rough surface. The roughness leads to turbulence, which disturbs the laminar flow. To ensure a laminar air flow in operating conditions, the resultant contaminants must be removed or at least greatly reduced. In the case of aircraft, the contaminants in question are mainly insects and possibly also icing. Contamination with insects occurs on the ground and in particular during take-off and landing, when insects collide with the aircraft and adhere to it.

Insects vary in size from 1 to 2 mm in the case of aphids and 20 mm in the case of moths. Insects can weigh up to 40 g. They consist essentially of two components, the exoskeleton and the hemolymph. The exoskeleton forms the protective shell and consists mainly of the polysaccharide chitin and the structural proteins sclerotin and resilin. The internal organs of insects are located in a free-flowing blood-like fluid, the hemolymph.

The hemolymph consists of proteins, which can coagulate and act like glue. As a result, parts of the exoskeleton adhere to surfaces [O'Donoghue et al., 2002].

For the occurrence of insects, mainly three factors are important:
vertical distribution
temperature and season
wind speed.

It should be borne in mind that most insects are found at relatively low altitudes. In contrast, at the usual cruising altitude of scheduled planes there is little likelihood of encountering insects.

Croom and Holmes suggested that protection against insect contamination would only be necessary up to an altitude of 152.4 m (500 ft), because in the authors' opinion hardly any insects occur at higher altitudes. According to Coleman, however, altitudes up to 1524 m (5000 ft) should also be considered: during a typical flight of an aircraft, 54% of the insects have already been collected on the ground, 33% between take-off and an altitude of 304.8 m (1000 ft) and the remaining 13% at an altitude of 304.8 m to 1524 m. The authors Maresh and Bragg agree that most insects are collected on the ground and while climbing.

Insect activity depends on the temperature. Activity is greatest in a temperature range from 21° C. to 27° C. Elsenaar and Hasnoot reported that insect density is highest in summer and in spring.

At high wind speeds there is a sharp drop in insect density.

As well as insects, icing of the wings can also lead to a change of the aerodynamics. In contrast to insect contamination, icing is also a safety problem. Thus, icing of parts of the aircraft not only leads to termination or hampering of laminar flow, but the ice itself can also lead to a marked weight increase.

A number of approaches are already known in the prior art for protecting aircraft against insect contamination and/or icing in particular on the ground and against contamination, in particular by insects, during the take-off phase:

One basic approach is to cover the surfaces of aircraft requiring protection with a removable device. This can be provided e.g. by a layer of paper, which is removed after take-off or by the use of a deflector, e.g. a Krueger flap, which is retracted after passing through the insect zone.

Thus, DE 35 29 148 proposes providing a film to protect aircraft against insect strikes. This film is removed as a whole after take-off and drawn in by means of a retracting device.

Moreover, DE 39 46 403 A1 proposes a similar principle, wherein a protective cover is provided with an active solution device.

DE 20 59 492 describes a mechanically destructible protective cover.

This approach has the disadvantage that the protective devices permanently increase the weight of the aircraft, as the protective devices, for example the Krueger flap, must remain on the aircraft permanently or alternatively, in the case when they are discarded after fulfilling their function, they cause considerable disposal problems owing to their size. Moreover, application of the corresponding covers (especially when they are not integral with the aircraft) is as a rule very laborious.

An alternative approach is to use cleaning devices, which can also perform their function during flight. This category includes scrapers and wipers and deluge sprinklers, for washing-away insect contamination. Examples of such applications are disclosed e.g. in DE 40 20 585 and in DE 40 16 850.

These systems have the disadvantage that the cleaning action they provide is inadequate. Attainment of laminar flow can be disturbed by the presence of just one insect contamination with a height ≥40 μm per running meter, so these mechanical cleaning systems are inadequate for many applications. In addition, they also increase the weight of the aircraft to a considerable extent, and permanently.

A third approach known in the prior art is the application of a coating that remains permanently on the surface to be protected and should prevent or reduce contamination owing to the nature of their surface. One approach in this connection is the use of elastic coatings, which as it were "reflect" the contaminants, as proposed for example in GB 2 299 280 A. A corresponding approach is also used in DE 1 190 342.

These protective layers have the disadvantage that they increase the weight of the aircraft permanently and as a rule provide unsatisfactory protective action against contamination. It has to be borne in mind that, especially during take-off, insects are impacted with high force on the aircraft surfaces. Furthermore, these protective layers only offer inadequate protection against icing, in particular while waiting on the ground.

In earlier research, water-soluble films were described for preventing insect contamination (Coleman, W. S.: Wind Tunnel Experiments on the Prevention of Insect Contamination by means of Soluble Films and Liquids Over the Surface. Rep. To the Boundary Layer Control Committee, BLCC Note 39, 1952). In later research these approaches were rejected on the grounds of complexity and impracticability (e.g. application of water in possibly cold conditions) (Cynthia C. Croom and Bruce J. Holmes, "Insect Contamination Protection for Laminar Flow Surfaces", NASA Langley Research Center Hampton Va.).

BRIEF SUMMARY

The problem to be solved by the present invention was therefore to overcome, as far as possible, the disadvantages described in the prior art. In particular, a reliable method was to be provided, by means of which insect contamination and icing that may occur on the ground and during the take-off phase can be removed effectively from the aircraft surface.

This problem is solved according to the invention by a method of protecting a part of the surface of the aircraft against contamination with insect residues and/or against icing, comprising the following steps:
a) coating the part of the surface to be protected with a coating that can, within a period of ≤3 hours from take-off of the aircraft and in normal flying conditions, reduce the adhesion to the part of the surface to be protected until detachment occurs, on the basis of
  (i) temperature change and/or
  (ii) UV radiation and/or
  (iii) addition of a decomposing component and/or
  (iv) difference in air humidity,
b) exposing the part of the surface to be protected to
  (i) a temperature change and/or
  (ii) UV irradiation and/or
  (iii) sufficient time for enzymatic degradation and/or
  (iv) a difference in air humidity,
    so that the coating together with any contaminants and/or icing thereon detaches.

The essence of the invention is therefore to provide, on aircraft, a layer that can be broken down physically, as a function of temperature, or chemically. It is designed in such a way that, in particular in the typical conditions of use (normal flying conditions) for aircraft, it only remains temporarily on the surface of the aircraft, wherein the detachment of the layer is always also determined by temperature-dependent physical and/or chemical effects and is not only brought about on the basis of mechanical effects.

"Normal flying conditions for aircraft" is to be understood, within the present context, as meaning that the aircraft takes off from the ground and then climbs to a typical cruising altitude. This preferably takes place within 30 minutes from take-off. Typical cruising altitude, in the sense of the present invention, is at least 7000 m. Temperature differences of ≤30° C., preferably ≤45° C., regularly occur during this. Compared with the conditions on the ground, at higher altitudes, e.g. the tropopause, there is also a considerable increase in natural UV radiation, whereas there is a marked decrease in air humidity.

A decomposing component in the sense of the present invention explicitly does not mean any chemicals that are used in the prior art for removing coatings that are provided permanently on aircraft. These excluded agents would include e.g. conventional paint strippers. Coatings provided permanently, in the sense of this definition, are coatings that are intended to remain on the aircraft for more than ten flights. Preferred decomposing components in the sense of the present invention are enzyme solutions and/or acids, and/or bases (acids and bases, in particular, when the binder (polymer) of the coating comprises cleavable ester bonds).

BRIEF DESCRIPTION OF DRAWINGS

FIG. 1 shows the photofragmentation of a primary main chain for a triazene system.

DETAILED DESCRIPTION

The idea behind the present invention is based on the fact that insects only occur up to a certain altitude (see above). Therefore protection against insect contamination is only required in the first few minutes of the flight, to exclude the disadvantages of insect contamination during the main flying time. This also applies correspondingly to icing, which occurs on the ground or during the take-off phase. Advantages of the method according to the invention are that insect contamination and icing can be removed reliably and completely at a variable time point after the take-off phase. Furthermore, the coatings provided for protection do not represent a permanent weight increase for the aircraft. Moreover, the protective layers can be adapted to suitable methods of application, in particular by applying them as hardening liquids.

On the basis of the present invention and in particular in connection with the present description, a person skilled in the art will be able to carry out a large number of possible embodiments of the invention:
i) Physicothermally Controlled Degradation of a Temporary Layer The temporary layer (protective layer) can be designed in such a way that, because the air becomes colder with increasing altitude, a temperature difference acts upon the coating after take-off, so that the coating falls below the glass transition temperature. As a result the coating becomes brittle. The brittle coating then no longer has sufficient stability and is broken up by the high air friction occurring during flight.

Alternatively or also additionally, the differential temperature required for embrittlement can also be produced by warming the surface before or during application of the protective layer. In the case of aircraft, this warming is for example conceivable in combination with de-icing, which naturally it is generally useful to carry out before application of a corresponding protective layer.

Examples of coating materials that are suitable for a corresponding temporary layer are polyurethane dispersions, acrylate dispersions or dispersions of thermoplastics, e.g. polyvinyl acetate. In this connection, a UV-curing acrylate system is often preferred. Another option is to use biological binders, e.g. casein.

Of course, additional stresses can be produced in the temporary layer by using a de-icing system during flight, e.g. at an external temperature of −50° C., by heating the coated areas to approx. 80° C.

A particular advantage of thermophysically degradable temporary layers is that the layer can be designed so that in normal flight it completely loses adhesion with the surface to be protected, without the need to take additional measures. Preferably, in this connection, warming, e.g. by the de-icing system, is not required in connection with application or after application.

When selecting the material for the layer, a person skilled in the art can also bear in mind the effects that occur in normal flight, i.e. in particular the shearing action that acts on said layers on account of air friction.

ii) Chemically Controlled Degradation of a Temporary Layer Based an UV Radiation For chemical degradation of the temporary coating, it is possible for example to use photo-acids as initiators. Photo-acids are substances that form acids under the action of UV radiation. Photo-acids can be divided into ionic and nonionic photo-acids. The ionic photo-acids belong to the group of onium salts, e.g. phenyldiazonium, diphenyliodonium, triphenylsulfonium or triarylphosphonium salts with the cations $BF_4^-$, $SbF_6^-$, $AsF_6^-$ and $PF_6^-$. Nonionic photo-acids are, as a rule, substances that form sulfonic acids under the action of UV radiation.

For systems that use photo-acids as initiator, UV light is used as the trigger. Through the interaction of photo-acids and UV light, protons form, which catalyze acid hydrolysis of the coating. Hydrolysis leads to cleavage of the polymer used in the coating and thus to decomposition (degradation) of the layer.

So that the coating can decompose, a polymer is used that contains acid-labile groups in the main chain of the polymer. An example of this is the implementation of ester groups in the main chain.

In the case of a photo-acid, the acid component is only released on irradiation; therefore the photo-acid can be incorporated in the coating without any problem. A preferred example of a photo-acid is diphenyliodonium hexafluoroantimonate. On irradiation with UV light, $HSbF_6$ forms, which breaks down into HF (strong Brønsted acid) and $SbF_5$ (strong Lewis acid). Release of the acid as catalyst takes place irreversibly and is shown in reaction scheme 1.

Reaction scheme 1: Formation of acid on irradiation with UV light

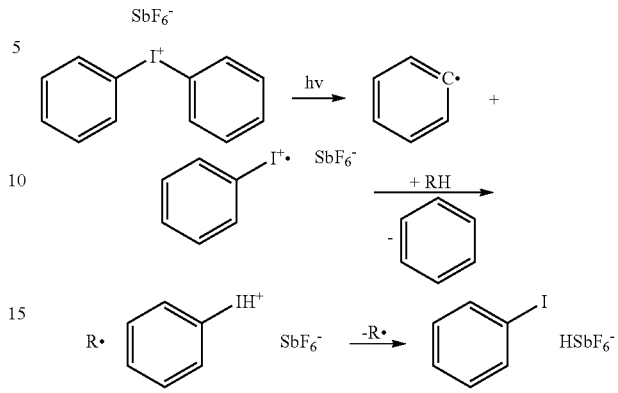

In the case of the ester groups proposed above, cleavage of the main polymer chain takes place via transesterification with an alcohol. The alcohol must be incorporated in the coating. So that the alcohol remains in the layer during application of the layer, preferably a low-volatility alcohol is selected. Primary alcohols are preferred, as these have the highest reaction rate. An example of an appropriate primary alcohol of low volatility is butyl diglycol.

Reaction scheme 2 shows the transesterification in the main chain of the polymer, which leads to chain shortening.

Reaction scheme 2: Transesterification in the main chain of the polymer

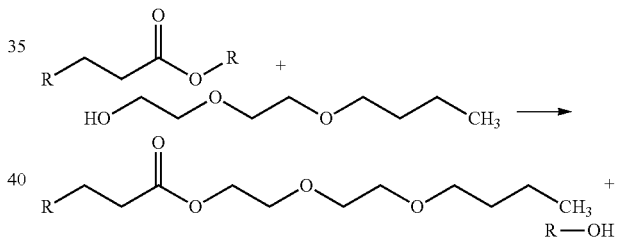

A polyurethane system is preferred for this system. Because the hydroxyl groups of the alcohol used would react with the isocyanate groups of the hardener of the polyurethane (PUR) system, it is preferable to polymerize the binder in solution in the presence of butyl acetate and then add the photo-acid (preferably diphenyliodonium hexafluoroantimonate) and the alcohol (preferably butyl diglycol). The coating is then applied as 1K-PUR system (single-component PUR system)—see Example 1 for a preferred recipe.

An alternative example of a concept for a coating that can undergo chemically controlled degradation (is designed to be temporary) under the action of UV radiation is the approach of integrating UV-sensitive groups in the main chain of the polymer. These UV-sensitive groups decompose when exposed to UV light. Examples of UV-sensitive groups are aryltriazene-chromophore systems (Ar—N=N—N). These groups decompose with formation of nitrogen, lowering the stability of the polymer. This process is shown schematically in FIG. 1.

FIG. 1 shows the photofragmentation of a primary main chain for a triazene system.

The structure of the polymer used is also shown in FIG. 1. An example of a corresponding synthesis is the diazotation of a bifunctional primary amine and subsequent reaction with a secondary bifunctional amine to aryltriazene. Because in this case bifunctional amines are used in each case, this results in formation of a thermoplastic. The schematic representation of the synthesis is shown in reaction scheme 3.

empty conduction band. During this, the electron absorbs the light energy hv, which is equal to or greater than the gap between valence band and conduction band. Through promotion of the electron, a gap is left in the valence band. This reaction thus leads to formation of an electron-hole pair. In the case of titanium dioxide, the required energy is 380 nm (3.23 eV) for anatase and 410 nm (3.10 eV) for rutile. A preferred example of a titanium dioxide pigment is "Degussa P25". This product has very high reactivity.

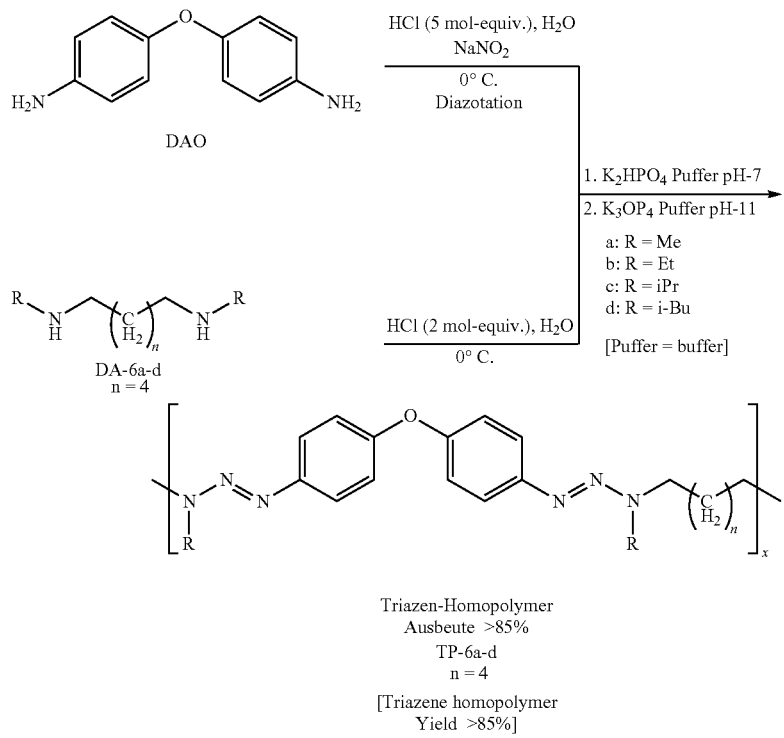

Reaction scheme 3: Synthesis of polymers with triazene units

A corresponding coating is then applied as a single-component system.

Another variant of a UV-sensitive temporary protective layer is based on radical degradation. Here, the coating is destabilized by a radical reaction in the binder. The radical reaction is triggered by photocatalytically active pigments. An example of a photocatalytically active pigment is titanium dioxide.

The principle of radical degradation of a pigmented coating that is triggered by UV radiation has been known for a long time, by the term chalking. As a result of the photochemical reaction, the pigment particles that are present lose their bond to the coating. On wiping such a surface, one gets the impression that it had been covered with chalk. Normally every effort is made to prevent this effect, but in the sense of the present invention it is expressly desirable.

An example of a corresponding coating system is an epoxy resin based on bisphenol-A. These resins have low UV-resistance, which makes them suitable for use in the sense of the invention.

The pigment preferably used, titanium dioxide, is a polymorphic compound and occurs in the anatase, rutile and brookite phases. Only the anatase and rutile phases are of interest for photocatalytic reactions, as amorphous titanium dioxide is not as a rule sufficiently photocatalytically active. Basically, photocatalytic reactions are initiated when an electron is promoted from a filled valence band into the A corresponding coating is used as a 2-component system.

Layers that are to be used in the method according to the invention, which decrease their binding force on account of UV radiation, can be arranged so that this decrease takes place without further measures, owing to increased UV radiation at higher altitudes during normal flight. It is, however, also possible for the aircraft to be specially equipped with an irradiating device, by means of which the required UV radiation is emitted at a desired time point, and leads to decomposition of the protective layer.

iii) Layers to be used According to the Invention, which Reduce Adhesion on the Basis of Decomposing Components As coatings to be used in methods according to the invention, it is also possible to use layers in which the binder contains polymers which are cleaved by enzymes, so that the adhesion between the layer and the substrate decreases. In this connection it is preferable for the polymers to be biopolymers, e.g. sugars or proteins. Said polymers can be used as the binder component of the coating.

The time point at which the decomposition reaction for the protective layer is to be started can be determined by adding a second (decomposing) component. This can be e.g.

within the scope of a wetting addition of protein-degrading enzymes to a protein-based protective layer (e.g. based on degraded casein).

A number of alternatives to biopolymer-based and enzyme-decomposable layers to be used according to the invention are known by a person skilled in the art. As an example, we may for example mention polyesters, which can, by adding bases or acids (in each case as decomposing component), be influenced with respect to their properties of adhesion to the substrate so that adhesion is reduced or even lost completely.

The advantage of these two-component systems is that the exact time point at which decomposition (degradation and hence decrease of adhesion) should begin is defined. Furthermore, part of the coating can be applied long before the aircraft takes off, and the second component can be applied just before take-off or even by means of an on-board spraying device during flight.

iv) Layers to be used According to the Invention, the Adhesion of which Decreases as a Result of a Difference in Air Humidity Basically it is also possible to design layers so that their adhesion to the substrate decreases on account of differences in air humidity. Systems where the decomposition process is initiated owing to decreased air humidity at high altitudes are preferred for the method according to the invention. For example, because of the low humidity at the tropopause, these layers become so brittle that there is a sufficient loss of adhesion.

Examples of corresponding coating systems are casein-based coating substances with low percentage of fillers.

It will be evident to a person skilled in the art that the effects described above, e.g. decreased adhesion owing to temperature difference and UV irradiation can also be combined, in order to achieve the desired result (detachment of the protective layer from the aircraft).

Preferably, the layer systems are designed so that they can reduce the adhesion of the part of the surface to be protected until detachment occurs, within ≤2 h, more preferably ≤1 h, even more preferably ≤30 min and preferably after (optionally complete) application in each case after the aircraft takes off and in normal flying conditions. Moreover, this condition refers in particular to normal flying conditions, in which other effects, e.g. due to drag, also contribute to detachment.

As already mentioned, it is preferable that for detachment of the protective layer of the part of the surface of the aircraft to be protected based on a temperature change, UV irradiation and/or a difference in air humidity is brought about at least partially (preferably completely, optionally together with the mechanical stresses in normal flying conditions) by changes in environmental conditions, due to the change in flying altitude after the aircraft takes off.

In many cases it is preferable for the method according to the invention to be supported in that the surface to be protected is coated with or is formed by a non-eroding layer of one of the following materials:

metal, e.g. special steel, titanium, aluminum or hard chromium plated metal,
metallized plastic, e.g. electrometallized plastic, e.g. hard chromium plated plastic,
plasma- or flame-sprayed metal layers e.g. of special steel or titanium,
ceramic wear-protecting layers, e.g. of titanium nitride or boron nitride,
DLC layers or diamond coatings,
elastomeric wear-protecting layers based on rubber, polyurethane or silicone,
inorganic layers produced by the sol-gel technique, e.g. silicate coatings,
inorganic-organic hybrid layers produced by the sol-gel technique,
organic paint coatings
plasma-polymer coatings.

These coatings can in particular also serve, in combination with the actual surface shape of the surface of the aircraft, to ensure laminar air flow (after removal of the protective layer and any contamination located thereon). In this case it is possible for a person skilled in the art to adapt the temporary protective layer to the respective surface in a suitable way. This means in particular that the temporary protective layer has sufficient adhesion while the aircraft is climbing, until the desired detachment (i.e. in the period when it must fulfill its protective function against insect strike) and on the other hand decomposes rapidly by a suitable decomposition mechanism, so that, together with the contamination, it loses adhesion to the surface to be protected, after it has fulfilled its function.

It is preferable for the protective layer that is to be used according to the invention to be designed so that insect contamination that was present prior to application of the protective layer also adheres to it. This is in particular the case when the aircraft surface was contaminated with insect residues during landing (when as a rule there is no longer any protective layer present, as this is regularly removed during the flight). With a layer of this design, cleaning of the surface to be coated prior to coating can optionally be omitted.

It is of course evident to a person skilled in the art that the protective layer can only perform its protective function in particular with respect to ensuring laminar flow of the region to be protected if this was either cleaned before application of the protective layer or if preferably the protective layer is designed in such a way that the contaminants present when it was applied are also removed during detachment of the protective layer according to the method according to the invention.

The last-mentioned variant can also be supported by a suitable form of the surface to be protected, e.g. by a hydrophobic design.

In many cases a method according to the invention is preferred in which the coating is applied by a device that is integral with the aircraft. Said device can for example comprise nozzles, which are embedded in the leading edge of the wing and can be brought out for the spraying operation. Alternatively, it can be a device that moves along the surface to be coated and applies the coating material by a spraying process. This device can for example be housed in the side wall of the fuselage during the flight.

The advantage of such devices is that they ensure a constant coating quality and are always available for a coating operation.

Alternatively and for some uses also preferably, application can, for the method according to the invention, take place by means of an external device. Said device can for example be a large hangar equipped with spraying devices. Alternatively it is possible to use devices like the de-icing vehicles that are currently typically used in the prior art. These vehicles are equipped with a lifting platform, on which a spraying device is mounted, so that they can be driven along the surfaces to be coated and the coating can be applied by a spraying process.

It may also be preferable for some applications if the UV radiation, which leads to detachment of the protective layer, is provided at least partially by an artificial UV source, which can be a component of the aircraft.

Preferably the method according to the invention is carried out so that the coating is applied less than 30 minutes, preferably less than 20 minutes, preferably less than 10 minutes before the aircraft takes off.

This is expedient in particular for coatings for which the decomposition process is already begun before take-off, e.g. by adding enzyme solutions.

The invention also relates to an aircraft with a coating on a part of its surface, wherein the coating is designed so that it can, within a period of ≤3 hours from take-off of the aircraft and in normal flying conditions, reduce the adhesion to the part of the surface to be protected until detachment occurs on the basis of (i) temperature change and/or (ii) UV radiation and/or (iii) addition of a decomposing component and/or (iv) difference in air humidity.

Aircraft are preferred according to the invention that comprise one of the (temporary) protective coatings described as preferable above and optionally a device for applying the coating and/or a device for spraying the coating (in particular with a decomposing component) and/or an artificial UV light source for irradiating the coating.

The aircraft according to the invention are protected against insect contamination that can arise on the ground, during take-off and during climbing. This also applies correspondingly to icing. A person skilled in the art will of course understand that contamination of the aircraft can first take place on the protective layer, but the aircraft itself (i.e. without the protective layer) is protected from the corresponding contaminants, as these can be removed according to the invention from the aircraft together with the protective layer by triggering a suitable mechanism.

The invention also relates to a device for applying a coating on an aircraft, which is designed so that it can, within a period of ≤3 hours from take-off of the aircraft and in normal flying conditions, reduce the adhesion to the part of the surface to be protected until detachment occurs on the basis of (i) temperature change and/or (ii) UV radiation and/or (iii) addition of a decomposing component and/or (iv) difference in air humidity, wherein the device is integral with the aircraft and wherein the device comprises nozzles that can be brought out and/or is designed so that it can move along the surface to be coated.

"Nozzles that can be brought out" means, in this context, that the nozzles can undergo a change of position relative to the surface of the aircraft, which comprises a perpendicular component relative to said surface. The embodiment wherein "the device can move along the surface to be coated" means in connection with this patent application that at least one part of the coating device can execute a movement that comprises a parallel component relative to the surface to be coated. Of course, an aircraft with a corresponding coating device also forms part of the invention.

The advantage of such a device has already been described above and consists in particular in that it ensures reproducible application of the coating and constant availability.

A further part of the invention is the use of a coating that is designed so that it can, within a period of ≤3 hours from take-off of the aircraft and in normal flying conditions, reduce the adhesion to the part of the surface to be protected until detachment occurs on the basis of (i) temperature change and/or (ii) UV radiation and/or (iii) addition of a decomposing component and/or (iv) difference in air humidity for protecting a part of a surface of an aircraft against contamination with insect residues and/or against icing.

The invention further relates to a use of a coating device for coating a part of the surface of an aircraft with a coating, which is designed so that it can, within a period of ≤3 hours from take-off of the aircraft and in normal flying conditions, reduce the adhesion to the part of the surface to be protected until detachment occurs on the basis of (i) temperature change and/or (ii) UV radiation and/or (iii) addition of a decomposing component and/or (iv) difference in air humidity.

The periods from take-off of the aircraft and in normal flying conditions described above as preferable are naturally also preferable for the uses according to the invention. This also applies correspondingly to the embodiments of the coating to be used according to the invention that are described as preferable.

The invention is explained in more detail below on the basis of examples.

EXAMPLE 1

Example of a Recipe for a Protective Layer for Detachment by UV Radiation

The following example of a recipe is a single-component system, which can be applied by a spraying process.

TABLE 1

| Recipe | | |
|---|---|---|
| Item | Raw material | Weight [g] |
| 01 | Slightly branched polyester containing OH groups (Desmophen 670) | 29.9 |
| 02 | Butyl acetate | 44.9 |
| 03 | Dicyclohexylmethane diisocyanate (Desmodur W) | 9.9 |
| 04 | Butyl diglycol | 15.0 |
| 05 | Diphenyliodonium hexafluoroantimonate | 0.3 |
| | Total | 100 |

EXAMPLE 2

Example of a Recipe for a Layer for which Adhesion Decreases Under the Action of UV Radiation by Radical Degradation The coating is a two-component system.

TABLE 3.1

| Item | Raw material | Weight [g] |
|---|---|---|
| | Recipe of base | |
| 01 | Polypox E 064 | 34.5 |
| 02 | Degussa P25 | 43.0 |
| 03 | Methoxypropyl acetate | 19.7 |
| 04 | n-Butanol | 2.8 |
| | Total base | 100 |
| | Hardener | |
| 01 | Polypox H 147 | 13.8 |
| | Total hardener | 13.8 |

EXAMPLE 3

Example of a Recipe for a Layer that Detaches as a Result of Cold Embrittlement

Application of an aqueous dispersion of polyvinyl acetate (Craymul 2325 from Cray Valley Kunstharze GmbH in Zwickau) with a dry film layer thickness of 15-30 µm on aluminum sheets, which can be hydrophobized with a plasma-polymer separating layer.

EXAMPLE 4

Example of a Recipe for a Layer that Becomes Brittle on Drying Out and Loses Adhesion Application of a casein-based coating on aluminum sheets with a dry film thickness of 15-30 µm. The casein coating is prepared as follows:

| | | |
|---|---|---|
| Borax solution | 5 g | 12.8 |
| Low-fat curd cheese | 24 g | 61.6 |
| Water | 10 g | 25.6 |
| | 39 g | 100 | dissolve 5 g borax in 20 g $H_2O$
mix 5 g of this solution with 24 g of low-fat curd cheese
leave to swell for 2 h
dilute with 10 g $H_2O$ After layer formation, all the example recipes detach from the respective substrate in (optionally simulated) take-off/flight conditions in less than 180 minutes, in the case of the example recipes 3 and 4 even in less than 60 minutes.

What is claimed is:

1. An aircraft with a coating on a part of its surface, wherein the coating is designed so that the coating, within a period of ≤3 hours from take-off of the aircraft and in normal flying conditions, reduces adhesion to the part of the surface to be protected until detachment occurs on the basis of (i) temperature change, wherein the temperature change is brought about at least partially by changes in environmental conditions due to a change in flying altitude after the aircraft takes off and the coating material is selected from the group consisting of polyurethane dispersions, acrylate dispersions, polyvinyl acetate dispersions and biological binders, (ii) UV radiation using a polymer that contains acid-labile groups in a main chain of a polymer and of photo-acids as initiators as the coating materials, (iii) addition of a decomposing component which is selected from a wetting addition of protein-degrading enzymes, acids and/or bases, and/or (iv) difference in air humidity, wherein the difference in air humidity is brought about at least partially by changes in environmental conditions due to a change in flying altitude after the aircraft takes off, and wherein a respective temporary layer of the coating is part of a system where the decomposition process is initiated owing to decreased air humidity at high altitudes, preferably because of the low humidity at the tropopause, the respective temporary layer becomes so brittle that there is a sufficient loss of adhesion.

2. The aircraft as claimed in claim 1, comprising a device for applying the coating and/or a device for spraying the coating and/or an artificial UV light source for irradiating the coating.

3. The aircraft as claimed in claim 1, wherein:
   the surface has a laminar flow profile,
   the coating comprises a temporary protective coating adhesively disposed on the laminar flow profile of the surface, and
   the temporary protective coating is configured to, during flight, reduce adhesion to the surface and expose the laminar flow profile of the surface to air.

4. The aircraft of claim 3, further comprising at least one of:
   a first spraying device configured to apply the temporary protective coating;
   an ultra-violet illumination source configured to irradiate the temporary protective coating during flight;
   a second spraying device configured to apply a decomposing component to the temporary protective coating during flight; and
   a heater configured to heat the temporary protective coating during flight.

5. The aircraft of claim 3, wherein the temporary protective coating is configured:
   to become brittle in response to lower temperature at increasing altitude, and
   to break up after becoming brittle in response to high air friction during flight.

6. The aircraft of claim 3, wherein the temporary protective coating is configured to protect the surface from at least one of: contaminants and icing.

7. The aircraft of claim 3, wherein the temporary protective coating is configured to remove, during flight, any contaminants present on the surface when the temporary protective coating was applied.

8. An aircraft with a coating on a part of its surface, wherein the coating is designed so that the coating, within a period of ≤3 hours from take-off of the aircraft and in normal flying conditions, reduces adhesion to the part of the surface to be protected until detachment occurs on the basis of temperature change, wherein the temperature change is brought about at least partially by changes in environmental conditions due to a change in flying altitude after the aircraft takes off and the coating material is selected from the group consisting of polyurethane dispersions, acrylate dispersions, polyvinyl acetate dispersions and biological binders.

9. The aircraft of claim 8, wherein the coating comprises a temporary layer configured to begin the decomposition process owing to the temperature change at high altitudes such that the respective temporary layer become sufficiently brittle so that there is a loss of adhesion.

* * * * *